(12) United States Patent
Litwin

(10) Patent No.: US 6,704,584 B2
(45) Date of Patent: Mar. 9, 2004

(54) MECHANISM FOR A WIRELESS DEVICE TO RELINQUISH ITS NETWORK MASTER STATUS BASED ON ITS POWER RESERVE

(75) Inventor: Louis Robert Litwin, Plainsboro, NJ (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/123,591

(22) Filed: Apr. 16, 2002

(65) Prior Publication Data

US 2003/0195019 A1 Oct. 16, 2003

(51) Int. Cl.[7] .............................. H04Q 7/32; H04Q 7/30
(52) U.S. Cl. ...................... 455/574; 455/572; 455/343; 455/127; 320/108; 320/111; 320/113
(58) Field of Search ................................ 455/572, 574, 455/550, 426, 462, 463, 343, 502, 517, 500, 403, 422, 445, 561, 67.1, 423, 552, 424, 465, 425, 422.1, 127, 569; 320/108, 111, 112, 113, 114, 115

(56) References Cited

U.S. PATENT DOCUMENTS

| | | | | |
|---|---|---|---|---|
| 4,839,918 A | * | 6/1989 | Hata ........................... 455/462 |
| 5,661,780 A | * | 8/1997 | Yamamoto et al. ......... 455/462 |
| 5,675,629 A | * | 10/1997 | Raffel et al. ................. 455/462 |
| 5,805,998 A | * | 9/1998 | Kodama ...................... 455/462 |
| 6,119,008 A | * | 9/2000 | Weeks et al. ................ 455/463 |
| 6,256,519 B1 | * | 7/2001 | Newton ........................ 455/462 |

\* cited by examiner

Primary Examiner—William Trost
Assistant Examiner—Keith Ferguson
(74) Attorney, Agent, or Firm—Joseph S. Tripoli; Harvey D. Fried; Joseph J. Koledka

(57) ABSTRACT

A system and method for relinquishing a network master device status in accordance with a device power reserve level includes a system having a network master device for monitoring its own power reserve level and relinquishing its network master status for that of network slave status when such level is below a threshold value, and one or more network slave devices where each such device is in signal communication with the network master device for monitoring its own power reserve level and relinquishing its network slave status for that of network master status when such level is above at least one of the threshold value and the power reserve level of the master; and further includes a corresponding method for a wireless master device to relinquish its network master status based on its power reserve level, where the method includes monitoring the power reserve level of the wireless master device, determining whether the monitored power reserve level falls below a threshold, and relinquishing the network master status of the wireless device for that of network slave status if the power reserve level falls below the threshold.

15 Claims, 4 Drawing Sheets

MECHANISM FOR A WIRELESS DEVICE TO RELINQUISH ITS NETWORK MASTER STATUS BASED ON ITS POWER RESERVE

BACKGROUND

The present disclosure relates to mobile communications, and in particular, to wireless communication networks. Many wireless networks use the concept of a master device with slave devices, hereinafter referred to as a "master/slave network". Typically, devices in such networks are battery-powered, and hence, they have a limited reserve of power. This is in stark contrast to the relatively unlimited reserve for a device connected to a utility power outlet.

The role of the master in a master/slave network is power-intensive. This master device cannot enter a sleep mode to conserve power, as it must be available to receive signals from the slave devices and maintain network synchronization. Usually, the master will also have to transmit synchronization beacons and the like to the slave devices in order to maintain network synchronization, and this will consume additional power. If the master device is battery-powered, its batteries can be drained due to the power-intensive nature of its role as master.

Thus, in conventional wireless networks, the battery reserve of the master device would typically be drained, and the device would be disconnected from the network once it lost power. Then, the slave devices would arbitrate until one became the new master of the network.

SUMMARY

These and other drawbacks and disadvantages of the prior art are addressed by a system and method for relinquishing a network master device status in accordance with a device power reserve level.

The system includes a network master device for monitoring its own power reserve level and relinquishing its network master status for that of network slave status when such level is below a threshold value, and one or more network slave devices where each such device is in signal communication with the network master device for monitoring its own power reserve level and relinquishing its network slave status for that of network master status when such level is above at least one of the threshold value and the power reserve level of the master.

The corresponding method includes monitoring the power reserve level of the wireless master device, determining whether the monitored power reserve level falls below a threshold, and relinquishing the network master status of the wireless device for that of network slave status if the power reserve level falls below the threshold.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a method and apparatus for a wireless device to relinquish its network master status based on its power reserve in accordance with the following exemplary figures, in which.

DETAILED DESCRIPTION OF PREFERRED EMBODIMENTS

Figure 1:
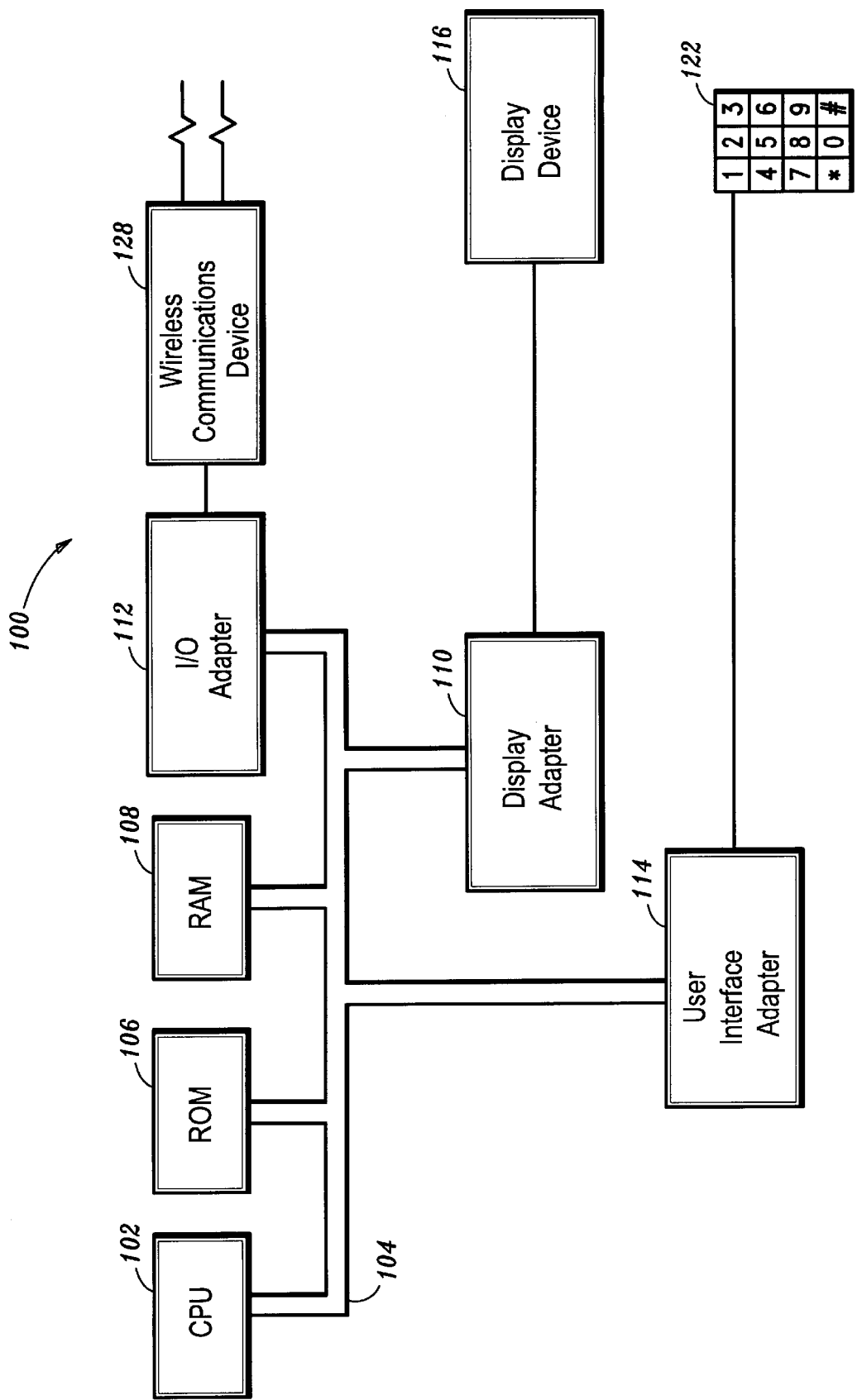
FIG. 1 shows a schematic diagram for a wireless device usable in a master/slave network according to illustrative embodiments of the present disclosure.

A method and apparatus are provided for a wireless device to relinquish its network master status based on its power reserve, thereby improving the battery life of the battery-powered wireless devices in the network. The present disclosure teaches embodiments that automatically and dynamically select as master the device with the highest battery charge, or, most preferably, a device that is plugged into a power outlet. Thus, the battery life of the other devices is extended.

The master device monitors its own power reserve, and, in some embodiments, also monitors the power reserves of other devices in the network. If the power reserve of the master device drops below a threshold, it will give up its role as master and allow another device with a greater power reserve to become the new master. This will enable the device to remain connected to the network without draining its power reserve as quickly, thus extending its battery life. Therefore, the method extends the battery lives of wireless network devices by assigning the role of master to the device with the greatest reserve of power.

The threshold reserve level or levels at which a master device seeks replacement may be predefined in terms of estimated time to shutdown, percentage of original charge, actual voltage level, and the like. Alternately, the threshold reserve level may be defined dynamically in terms of the difference between the reserve level of the current master device and that of the most fully charged slave device currently operating in the network.

In wireless master/slave networks, the master device is in control of the network and handles tasks such as, for example, security, synchronization, and determining when the various slave devices can transmit. Typically, any device can become a master of the network as long as there is only one master at any given time. With the exception of the master, all of the other devices on the network are slaves. The slaves get their synchronization signals from the master.

For battery-powered devices, it is advantageous to be a slave because the slave devices can go into a sleep mode to conserve power. They will wake up from the sleep mode if a user wants to send information from the device. In addition, they will periodically wake up to check for pages from the master. If the master has information to send to the slaves, it will send a page to the slaves. This page informs the slave that there is data for it to receive. The slave will periodically wake up in order to listen for any such pages from the master. The slave is able to conserve power by using this sleep mode since it can turn off many sections of the transceiver. The slaves will often not even need to maintain synchronization with the network since each can resynchronize when it wakes up.

The master device does not have the luxury of going into sleep mode for several reasons. One reason that the master must constantly be running is that it controls the synchronization for the entire network, and thus, it must constantly run the timebase for the network. Another reason is that the master must always be running in order to process any incoming data from any of the slaves. If the master were to enter a sleep mode, the slaves would be unable to contact the master and the network would break down. The need for the master to be constantly running means that the master device will consume power at a much faster rate than the slave devices. This is a particular concern if the master is a battery-powered device.

Embodiments of the present disclosure automatically, preferably invisibly to the user, and dynamically re-assign the role of master from devices with low battery power reserves to devices with higher battery reserves, or, most preferably, to a device that is plugged into a utility power outlet if such a device exists on the network.

Exemplary embodiments are set forth below, although it shall be recognized that those of ordinary skill in the pertinent art may expand and/or modify the exemplary embodiments to meet design or other goals without departing from the scope or spirit of the present disclosure.

As shown in FIG. 1, a wireless device is indicated generally by the reference numeral 100. The wireless device 100 may be embodied, for example, in a mobile cellular telephone according to embodiments the present disclosure. The wireless device 100 includes at least one processor or central processing unit ("CPU") 102 in signal communication with a system bus 104. A read only memory ("ROM") 106, a random access memory ("RAM") 108, a display adapter 110, an input/output ("I/O") adapter 112, and a user interface adapter 114 are also in signal communication with the system bus 104.

A display unit 116 is in signal communication with the system bus 104 via the display adapter 110, and a keypad 122 is in signal communication with the system bus 104 via the user interface adapter 114. The wireless device 100 also includes a wireless communications device 128 in signal communication with the system bus 104 via the I/O adapter 112, or via other suitable means as understood by those skilled in the art. As will also be recognized by those of ordinary skill in the pertinent art based on the teachings herein, alternate embodiments are possible, such as, for example, embodying some or all of the data or program code in registers located on the processor 102.

Figure 2:
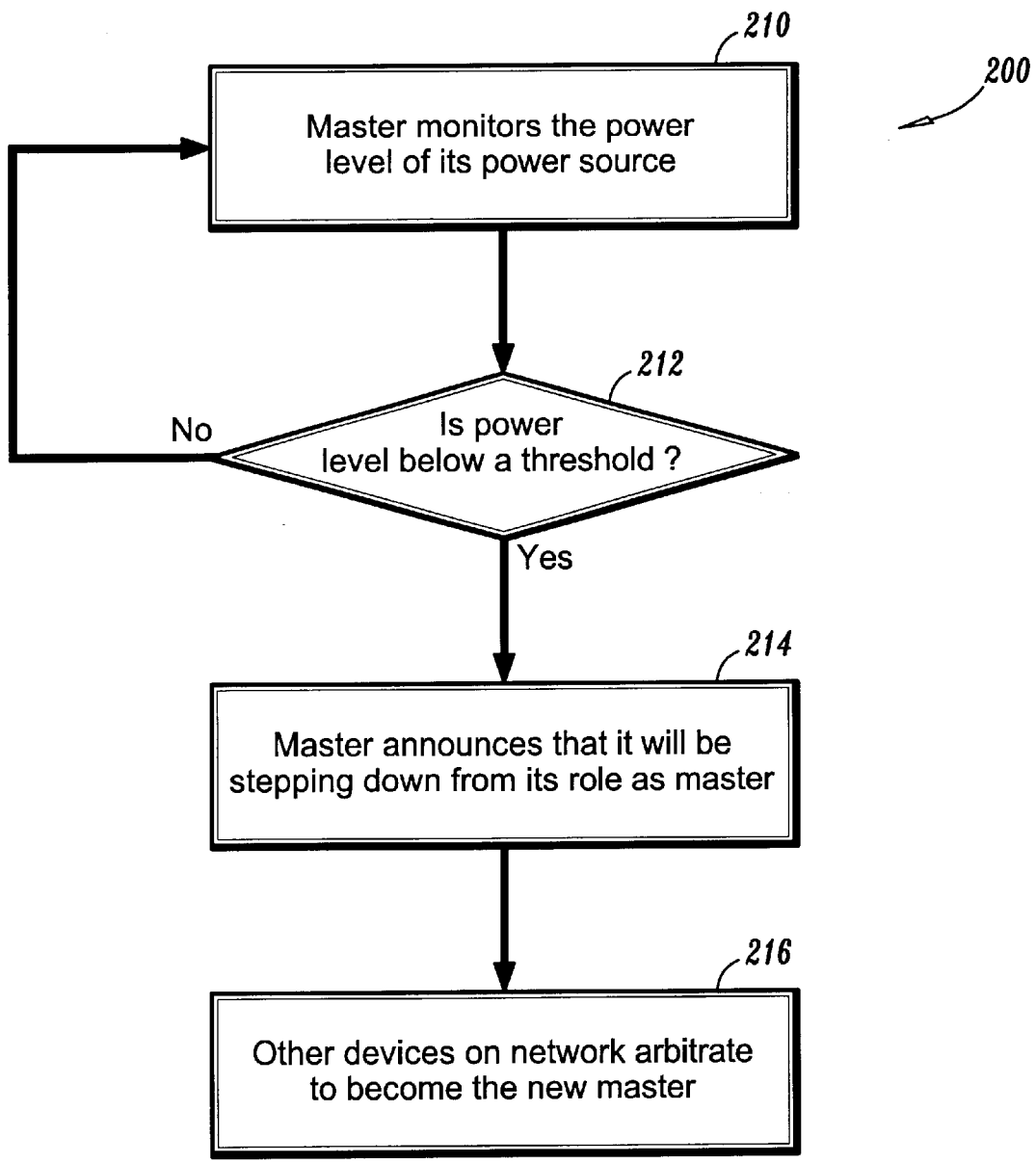
FIG. 2 shows a flow diagram for a master step-down method of using the device of FIG. 1.

Turning to FIG. 2, a master step-down method embodiment is indicated generally by the reference numeral 200. The master step-down method 200 includes a function block 210 wherein the master device monitors the power reserve of its own power source. Next, a decision block 212 determines whether the monitored power reserve is below a threshold. If the power reserve is not below the threshold, control is returned to the function block 210 for further monitoring. However, if the monitored power reserve is below the threshold, control is passed to a function block 214 wherein the master announces that it will be stepping down from its role as the master device in the wireless master/slave network. Next, control passes to a function block 216 wherein other devices on the network arbitrate to determine which slave device will become the new master.

Thus, in operation of the master step-down method embodiment 200, the master device will periodically monitor its power reserve and it will compare this level to a threshold. If the power reserve is above the threshold, operation will continue normally. However, if the power reserve is below the threshold, the master will send a broadcast message to all slaves on the network stating that the device will step down. The other devices on the network will then arbitrate to become master. If other slave devices' power reserves are below the threshold, then they have the option of not attempting to become master due to their low power reserve. One possibility for the case where all the devices are below the threshold power reserve is that the devices can monitor the channel to see if a new master is there. If not, the low power devices can wait for a specified time and then they will arbitrate to become master despite their low power reserves, in order to keep the network running.

Figure 3:
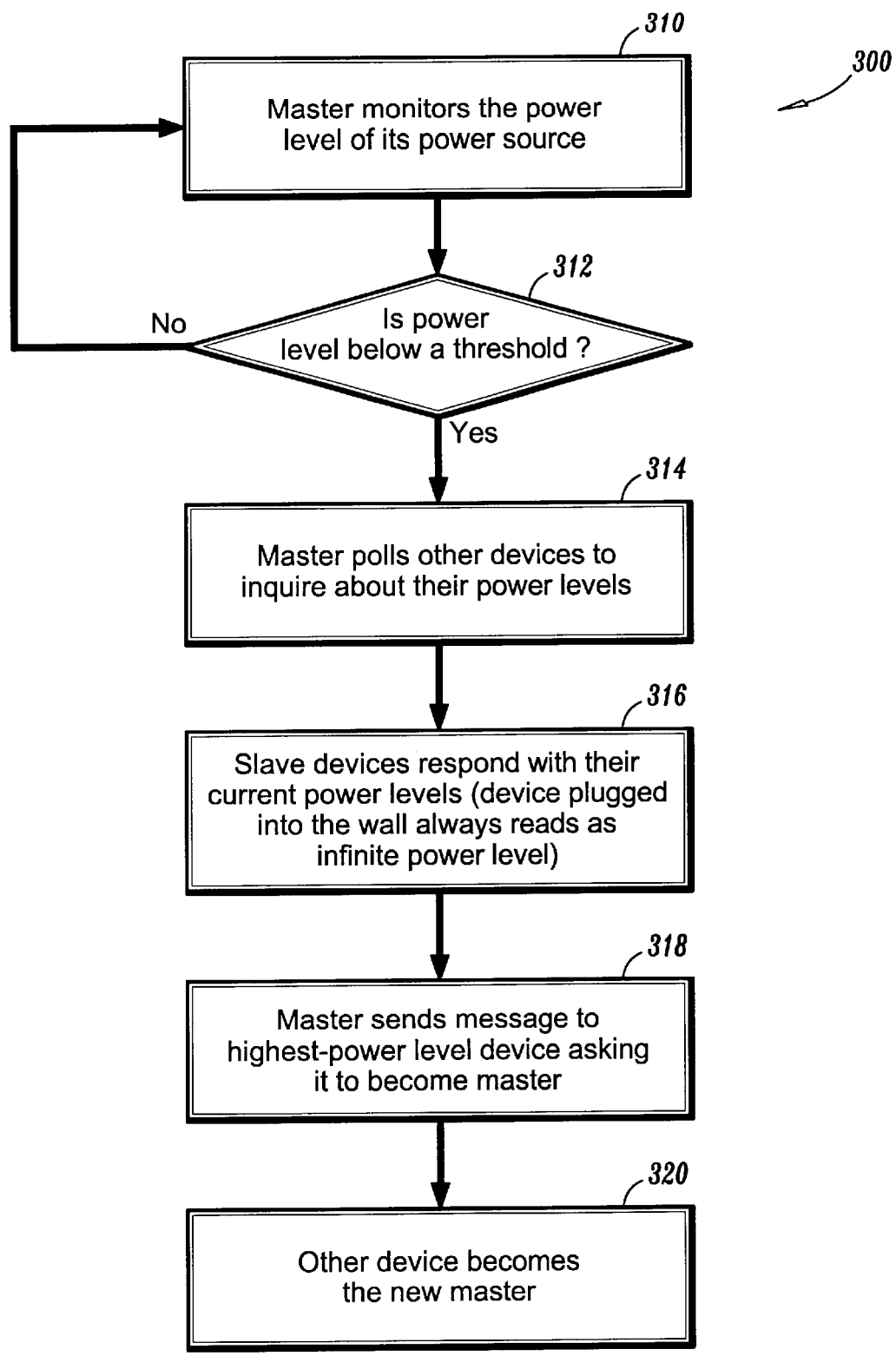
FIG. 3 shows a flow diagram for a master re-assign method of using the device of FIG. 1.

Turning now to FIG. 3, a master re-assign method embodiment is indicated generally by the reference numeral 300. The master re-assign method 300 includes a function block 310 wherein the master device monitors the power reserve of its own power source. Next, a decision block 312 determines whether the monitored power reserve is below a threshold. If the power reserve is not below the threshold, control is returned to the function block 310 for further monitoring.

However, if the monitored power reserve is below the threshold, control is passed to a function block 314 wherein the master polls other network devices to inquire about their power reserves. Block 314 leads to a function block 316 wherein slave devices on the network respond with their current power reserves. Here, a device that is plugged into a utility power outlet (e.g., an AC wall outlet) will return a maximum or infinite power reserve. Block 316 leads to a function block 318 wherein the current master sends a message to the slave device having the highest power reserve, asking it to become the new master. Next, control passes to a function block 320 wherein the asked slave device accepts the inherent responsibilities and becomes the new master.

Thus, in operation of this exemplary master re-assign method embodiment 300, the master device will periodically monitor its power reserve level and it will compare this level to a threshold. If the power reserve is above the threshold, operation will continue normally. However, if the power reserve is below the threshold, the master will poll the other devices to find out what their power reserves are.

The slave devices will respond to the master with a message indicating their power reserves. Battery-powered devices will indicate the level of power left in the battery. Devices that are plugged into a power outlet will report that with a special level, such as, for example, by indicating an 'infinite' power reserve, since these devices are the most desirable for the master role. The current master will then select the device with the highest power reserve and it will send that device a message indicating that it wishes to reassign the role of master to that device. That device then becomes the new master and the old master assumes a slave role to conserve power.

Figure 4:
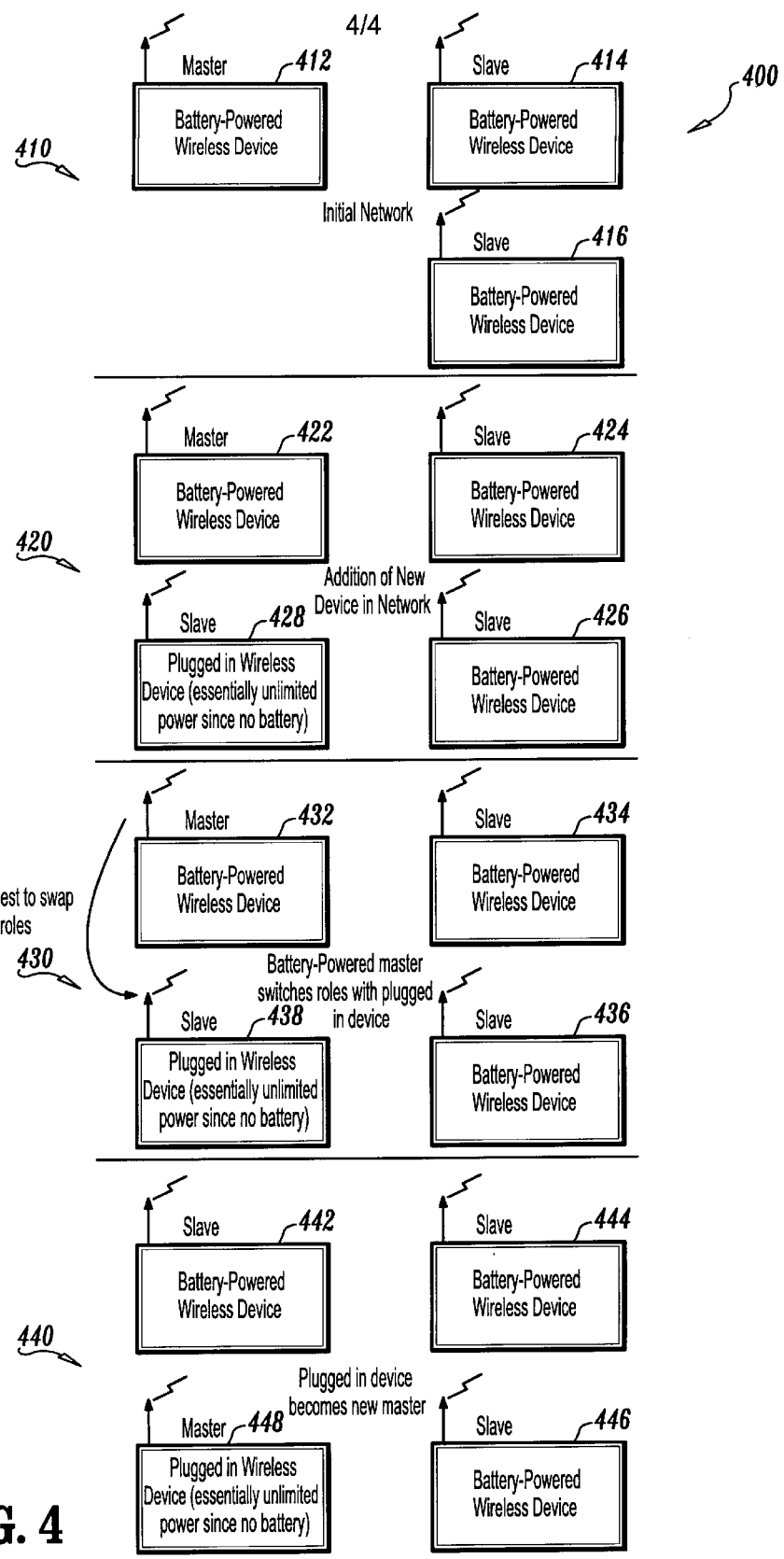
FIG. 4 shows a progression diagram for an illustrative use of the device of FIG. 1 in correspondence with the method of FIG. 3.

As shown in FIG. 4, an illustrative time-wise use sequence of wireless devices in accordance with a master re-assign method is indicated generally by the reference numeral 400. Like reference numerals with incremented 10's digits are used to indicate like elements in the several frames. A first time-wise frame of the sequence 400 shows an initial network 410 having a master device 412 in signal communication with first and second slave devices, 414 and 416, respectively. Each of the devices 412, 414 and 416 are battery-powered wireless devices. A second time-wise frame shows an updated network 420 wherein the difference between the network 420 and the network 410 is the addition of a third slave device 428. The added slave device 428 is a plugged-in wireless device that has an essentially unlimited power reserve since it does not rely on a battery.

A third time-wise frame of the sequence 400 shows an updated network 430 wherein the master device 432 has requested a role swap with the plugged-in slave device 438.

A fourth time-wise frame shows an updated network 440 that indicates that the master device 432 has become a slave device 442, and that the plugged-in slave device 438 has become a plugged-in master device 448 in order to conserve the battery reserve of the former master device 432, now slave device 442.

The features and advantages described in this disclosure may be extended to other embodiments. For example, the master could periodically broadcast its power reserve. The slaves would then compare the master's power reserve with their own power reserves, and if they had more power, they could send a message requesting to switch roles with the master. Similarly, other embodiments may be implemented that rest upon the basic features of the present disclosure.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

As will be recognized by those of ordinary skill in the pertinent art based on the teachings herein, alternate embodiments are possible. Given the teachings of the disclosure provided herein, those of ordinary skill in the pertinent art will contemplate various alternate configurations and implementations of the system while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for a wireless master device to relinquish its network master status based on its power reserve level, the method comprising:

monitoring the power reserve level of the wireless master device;

determining whether the monitored power reserve level falls below a threshold;

relinquishing the network master status of the wireless master device for that of network slave device status if the power reserve level falls below the threshold; and polling the network slave devices to determine their respective power reserve levels;

receiving responses from the slave devices indicative of their respective power reserve levels;

requesting that the responsive slave device having the greatest power reserve level succeed as the network master device; and exchanging roles with the requested slave device such that the requested device becomes the network master and the former master becomes a slave.

2. A method as defined in claim 1, further comprising:

broadcasting to the network that the network master device will be relinquishing its network master status; and arbitrating between the slave devices on the network to determine the succeeding network master device.

3. A method as defined in claim 1 wherein a device that is powered by a utility power outlet produces a polled response indicative of a maximum power reserve level.

4. A method as defined in claim 1, further comprising:

periodically broadcasting the monitored power reserve level of the network master device;

comparing by a slave of the broadcasted reserve level of the master with its own power reserve level;

sending a message from the slave to the master if the slave has a greater power reserve level than the master indicating that the slave is requesting to succeed as the network master device.

5. A method as defined in claim 1 wherein the power reserve level threshold is predetermined for each wireless device.

6. A method as defined in claim 1 wherein the power reserve level threshold is variably responsive to the power reserve level of at least one other wireless device.

7. A method as defined in claim 1 wherein the power reserve level threshold is variably responsive to a dynamically estimated remaining time to power depletion of the wireless device.

8. A program storage device readable by machine, tangibly embodying a program of instructions executable by the machine to perform method steps for a wireless master device to relinquish its network master status based on its power reserve level, the method steps comprising:

monitoring the power reserve level of the wireless master device;

determining whether the monitored power reserve level falls below a threshold;

relinquishing the network master status of the wireless master device for that of network slave device status if the power reserve level falls below the threshold; and polling the network slave devices to determine their respective power reserve levels;

receiving responses from the slave devices indicative of their respective power reserve levels;

requesting that the responsive slave device having the greatest power reserve level succeed as the network master device; and exchanging roles with the requested slave device such that the requested device becomes the network master and the former master becomes a slave.

9. A program storage device as defined in claim 8, the method steps further comprising:

broadcasting to the network that the network master device will be relinquishing its network master status; and arbitrating between the slave devices on the network to determine the succeeding network master device.

10. A program storage device as defined in claim 8, the method steps further comprising:

periodically broadcasting the monitored power reserve level of the network master device;

comparing by a slave of the broadcasted reserve level of the master with its own power reserve level;

sending a message from the slave to the master if the slave has a greater power reserve level than the master indicating that the slave is requesting to succeed as the network master device.

11. An apparatus for relinquishing a network master status in accordance with a power reserve level, the apparatus comprising:

monitoring means for monitoring the power reserve level of the wireless master device;

thresholding means for determining whether the monitored power reserve level falls below a threshold;

relinquishing means for relinquishing the network master status of the wireless master device for that of network slave device status if the power reserve level falls below the threshold; and polling means for polling the network slave devices to determine their respective power reserve levels;

receiving means for receiving responses from the slave devices indicative of their respective power reserve levels;

requesting means for requesting that the responsive slave device having the greatest power reserve level succeed as the network master device; and exchanging means for exchanging roles with the requested slave device such that the requested device becomes the network master and the former master becomes a slave.

12. An apparatus as defined in claim 11, further comprising:

broadcasting means for broadcasting to the network that the network master device will be relinquishing its network master status; and arbitrating means for arbitrating between the slave devices on the network to determine the succeeding network master device.

13. An apparatus as defined in claim 11, further comprising:

periodic means for periodically broadcasting the monitored power reserve level of the network master device;

comparing means for comparing by a slave of the broadcasted reserve level of the master with its own power reserve level;

messaging means for sending a message from the slave to the master if the slave has a greater power reserve level than the master indicating that the slave is requesting to succeed as the network master device.

14. A method for a wireless master device to relinquish its network master status based on its power reserve level, the method comprising:

monitoring the power reserve level of the wireless master device;

determining whether the monitored power reserve level falls below a threshold; and relinquishing without human intervention the network master status of the wireless device for that of network slave status if the power reserve level falls below the threshold.

15. An apparatus for relinquishing a network master status in accordance with a power reserve level, the apparatus comprising:

monitoring means for monitoring the power reserve level of the wireless master device;

thresholding means for determining whether the monitored power reserve level falls below a threshold; and relinquishing means for relinquishing without human intervention the network master status of the wireless device for that of network slave status if the power reserve level falls below the threshold.

* * * * *